United States Patent
Park

(10) Patent No.: US 11,415,097 B1
(45) Date of Patent: Aug. 16, 2022

(54) SYSTEM AND METHOD FOR VERTICAL MECHANICAL SEPARATION OF WATER

(71) Applicant: Brent K Park, Falls Church, VA (US)

(72) Inventor: Brent K Park, Falls Church, VA (US)

(*) Notice: Subject to any disclaimer, the term of this patent is extended or adjusted under 35 U.S.C. 154(b) by 0 days.

(21) Appl. No.: 17/221,393

(22) Filed: Apr. 2, 2021

(51) Int. Cl.
*F03B 17/02* (2006.01)

(52) U.S. Cl.
CPC .............. *F03B 17/025* (2013.01); *Y02E 10/20* (2013.01)

(58) Field of Classification Search
CPC ..................................................... F03B 17/025
See application file for complete search history.

(56) References Cited

U.S. PATENT DOCUMENTS

| | | | |
|---|---|---|---|
| 4,718,232 A | 1/1988 | Willmouth | |
| 5,944,480 A | 8/1999 | Forrest | |
| 8,456,027 B1* | 6/2013 | Seehorn | H02K 7/1823 290/1 R |
| 8,516,812 B2 | 8/2013 | Manakkattupadeettahil | |
| 2006/0042244 A1 | 3/2006 | Villalobos | |
| 2013/0318960 A1* | 12/2013 | Chiu | F03B 17/025 60/496 |
| 2014/0130497 A1* | 5/2014 | Anteau | F03B 17/005 60/495 |
| 2014/0196450 A1 | 7/2014 | Boyd | |
| 2019/0338747 A1* | 11/2019 | Townsend, IV | F03B 17/04 |

* cited by examiner

*Primary Examiner* — Michael C Zarroli

(57) ABSTRACT

A vertically arranged water tower system is operated using a long buoyant device that spans upper and lower chambers thru a watertight compressible bellows. Raising the buoyant device by controlling the water level in the water tower creates a void in the lower chamber, equal to the volume of the buoyant device no longer in the lower chamber. The void is created without displacing water in the lower chamber. Water or a buoyant object fills the void from slightly higher level than the lower chamber. After reconnecting the upper and lower chambers, water is extracted and released near the top of the upper chamber and the buoyant device is lowered. Released water is used for energy and power productions and recycled.

8 Claims, 9 Drawing Sheets

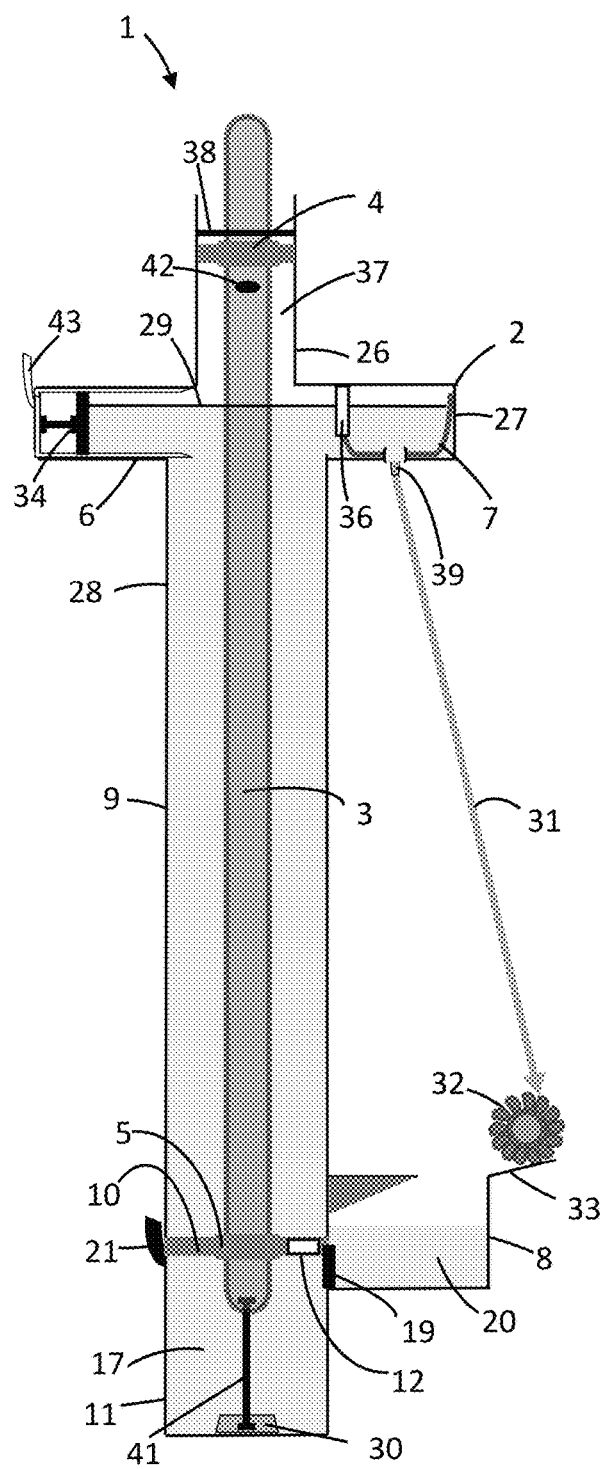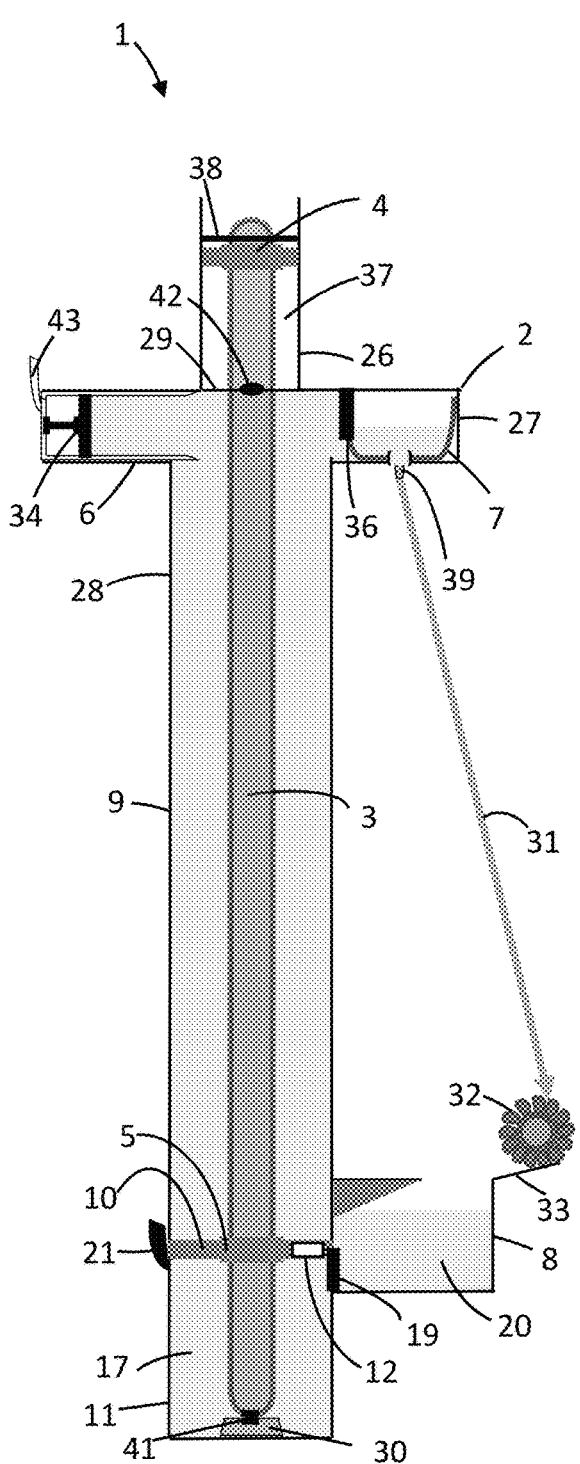
FIG. 7
FIG. 8

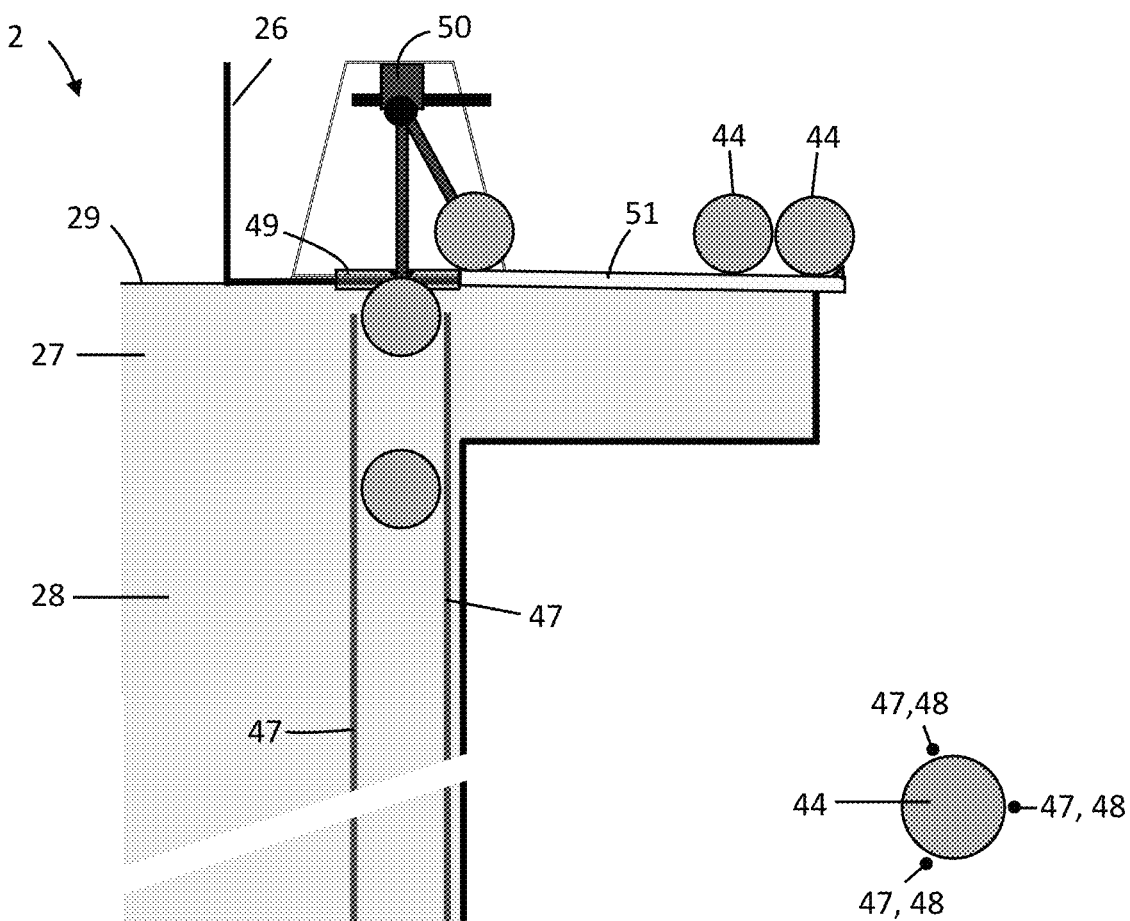
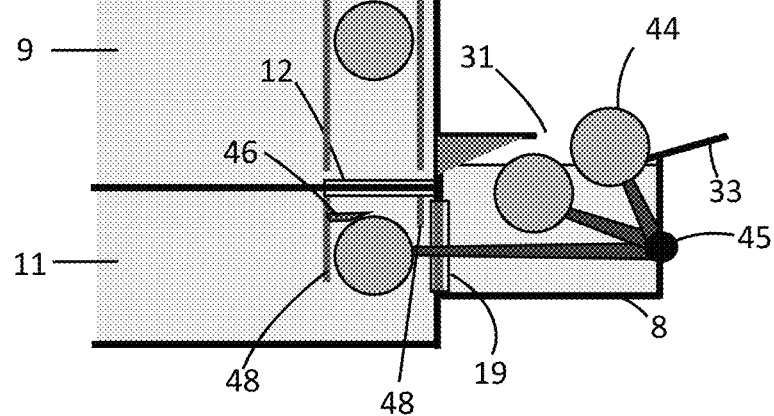
FIG. 12a
FIG. 12b

SYSTEM AND METHOD FOR VERTICAL MECHANICAL SEPARATION OF WATER

BACKGROUND OF THE INVENTION

With ever increasing need for more power or electricity while minimizing negative impacts to the environment, exploring and expanding renewable energy options need to continue. Over the years, compared to other renewables such as the wind and solar energies, hydropower has not seen much growth.

Hydroelectric plants use water flowing through turbines to generate electricity. Flowing water, a source of input fuel for hydropower, is renewed by snow and rainfall and hydroelectric plants are built near large water sources. As such the most common type of hydropower uses a dam on a river to store water in a reservoir. Accumulated water behind a dam is a source of input fuel with potential energy for hydropower generators. Another type of hydroelectric power plant is called pumped-storage hydropower facilities. Excess power from the grid is typically used to pump up water into an upper reservoir, and then released to generate electricity when needed. Pumped-storage hydropower uses more energy than they generate but is effective in storing excess capacity from the grid.

The present invention focuses on providing input fuel to a higher elevation in the form of water or a buoyant object to various types of applications including generating electricity. The present invention focuses on recycling and delivering water as input fuel for energy and power productions.

New renewable energy options are often compared to either wind or solar energies for various reasons, including the impact to the environment, scalability, siting, costs to build and operate, etc. Comparing the present invention to a mega-watt wind turbine generator (1-MW WTG) should not be taken as a limit, but as an exemplification of the present invention that is scalable and adaptable.

The capacity factor for WTGs has improved over the years and industry estimates that an actual real-world energy output is about 30%. In other words, on average, primarily due to useable wind availabilities, 1-MW rated WTG generates~300 kW of electricity. Of relevance to the present invention, for casual comparisons throughout, is the size of a typical 1-MW WTG which is about 100-m tall with a hub height of 70-m and 60-m rotor diameter. Equipment weighs~150 metric tons, including an electrical generator mounted at the top of the hub. Generally speaking, the larger the WTG, greater the energy output.

Hydropower generated is proportional to the head and the flow. The head is the vertical height difference between the water level in a reservoir, for example, and the elevation where the hydro turbine is placed. For a hydroelectric generator to produce 300 kW, the input fuel should have sufficient potential energy (P.E.)=(mass×gravity×height)×efficiency—that could be in the form of ~900 liters of water per second through a penstock at 50-m head—assuming reasonable ~70% overall system efficiency, which is a product of various factors including net head efficiency, turbine efficiency, drive efficiency, and generator efficiency. This equates to steadily supplying water totaling ~$2.84 \times 10^{10}$ liters/year at 50-m head—to generate just 300 kW of electricity. This clearly explains why traditional MW-scale hydropower plants are built near a very large source of water.

One way to overcome the need for a large volume of flowing water is to recycle the water. For the present invention, water recycling involves collecting water or hydro discharge—water coming out of a turbine—and making the water available at a higher level for release to generate electricity, for example.

Without limiting any aspects, the present invention exemplifies delivering ~27,000 liters per cycle of 3-sec to a reservoir 50-m above a hydroelectric turbine generator to match the electricity output from a 1-MW WTG. In this example, in a steady state mode of operation, the reservoir, with at least twice the capacity of the per cycle volume, would continuously release ~900 liters/sec as input fuel to a hydroelectric turbine generator.

The present invention prefers to use a large volume device, called "driver" hereafter, to achieve vertical mechanical separation of water (VMSW) in a vertically arranged water tower with a lower chamber and an upper chamber. A positively buoyant driver moves with changes in the water level. The buoyancy force on an object remains constant at any water depth so long as the water depth exceeds the object's neutral buoyancy point (NBP) where the buoyancy force and the weight of the object are balanced. The present invention starts with a water tower filled to the driver's NBP. As the water level is raised in the water tower, the buoyant driver moves up producing a void in the lower chamber of the water tower. To put it simply, the present invention focuses on producing and using this void in the lower chamber to recycle water. The present invention, then combines water from both chambers and the same volume of water that filled the void is released from an upper chamber. Released water turns a turbine to generate electricity, and hydro discharge is collected in the recycle chamber for reuse.

Field of the Invention

The present invention focuses on providing input fuel to various applications for the electricity and energy production industries.

The Prior Art

The prior art systems recognize the benefits of using the buoyancy force of water to raise one or more buoyant objects to gain potential energy that could be converted to other forms of energy including electricity. Techniques vary widely from system to system in an effort to insert, inject, or circulate buoyant objects. For example, US20140196450A1 describes a method for inserting buoyant objects through one water chamber at a time, through several chambers, leading the object to the top of the water tank.

Yet another example is WO2014/128729A2 that proposes a 2.8-MW system using a hollow launching chamber in the lower part of the water tank with three gates. The proposed design uses a large weight assembly that could be inserted into a hollow launching chamber using 0.7 MW energy. The proposed system uses a direct-drop method to rotate a chain with a 10,000 kg weight assembly every 30 sec. The proposed system has the total energy in a form of potential energy at 3.92 MJ=10,000 kg×9.8m/sec2×40 m. Assume 100% efficiency to estimate the maximum capacity of the proposed design, i.e., ignore how the weight assembly gets into a hollow launching chamber, placed in the buoyancy chamber without loss of water and pulled out of the water tank at the top. Converting 100% of the total energy of 3.92 MJ every 30 sec into electricity makes the proposed design, in an ideal case, a 0.13-MW rated system that would use 0.7 MW to operate.

Other examples include US5944480A, JPH10141204A, JP2002138944A, and DE102012009226A1 that rely upon either a vacuum effect to retain liquid in the tube or use a watertight seal to slide balls into the tube or apply air pressure in the drive system to load. US20190338747A1 features a start/stop system with buoyant modules moving through a bi-level water tank. US20140130497A1 explains a system that relies on fluid flow due to pressure differentials to perform the work. US20130318960A1 uses a bladder to control buoyancy mechanism while US8456027B1 describes a system to rotate the driver shaft by alternately charging the buoyancy vehicles with the pressurized gas.

The prior art systems also include closed-loop system, hermetically sealed buoyancy chamber or multi-chamber configurations. US20060042244A1, for example, provides details of a fluid shaft used in a hermetically sealed buoyancy chamber with at least two separate columns with valves and associated tanks to transfer fluid by injecting air in and out of the two diaphragm-defined chambers inside the tanks. US4718232A discloses a closed-loop system with a long continuous chain or carrier to which hollow spheres are attached. Multiple valves with pressure control help with movements of the spheres. WO2014/035267A1 claims to generate power using floating devices alternatively while US8516812B2 discloses a vertical pipe system to float objects and guide them down through another pipe. As the ball drops, a rotatable flywheel is engaged by a rope. Each of the spheres rise through a pipe one at a time. An elaborate mechanism is introduced to recycle spheres using a sphere injector system with multiple valves and tubes. It also uses a hard rubber ball to slow down and move the sphere into loading position.

JP2020190243A disclosure uses a floating object in a water tank. The energy that could be generated by the floating object is proportional to the difference in water surface height in the water tank. Water surface is raised and lowered by lifting and lowering yet another object called weight in the water tank, which is connected to a (counter) weight outside the tank and operate in an alternating mode to lower and raise the weight inside. Additional details are needed to explain critical aspects of the proposed design. For example, as soon as the buoyant weight inside the tank starts going into the water, the buoyancy force on the inside weight is added to the outside weight to prevent the inside weight from going into the water. For the buoyant weight inside the water tank to move down into the water, the weight outside has to be lifted to counter the buoyancy force on the weight inside.

The prior arts have introduced many creative ideas to take advantage of the buoyancy force to gain potential energy for buoyant objects. The need still remains to continue to explore other practical ways to take advantage of buoyancy force in generating electricity.

Technical Problem

For the prior art systems, it is important to recognize that each time a buoyant object enters an entry or lower chamber that is filled with water, the water volume equal to the object volume has to be displaced out of the entry chamber. In other words, when the entry door is closed with an object inside the entry chamber, the water equal to the volume of the object is no longer in the entry chamber. As this buoyant object moves through various stages, the lower part (entry chamber) of the system will be filled with water from the part above and ultimately from the highest level in the water tower system-equal to the volume of the object. Energy needed to replenish water at the highest level of the system generally is more than the energy the system could generate. Quite possibly the most difficult aspect of using a buoyant object for energy production is to place the buoyant object into the lower part of the water tower without water loss. If the system could recycle buoyant objects for energy productions, the system should be able to recycle water as well.

Solution to Problem

One way to place a buoyant object or water into the lower chamber without water loss is to produce an empty space or a void in the lower chamber in the water tower by dropping the water level but not the water volume—using preferably much less energy than the system would generate.

BRIEF SUMMARY OF THE INVENTION

It may be useful to start with a short technical description of the present invention to build the foundation for more detailed discussion for producing and using the void in the lower chamber of the water tower.

The present invention operates a water tower comprised of vertically arranged water chambers separated via a sliding tower door and an alignment ring. Using watertight compressible bellows, a buoyant driver moves through the alignment ring without water loss from the upper chamber to the lower chamber. With the tower door closed and as the driver rises in the water tower, a void is produced in the lower chamber equal to the portion of the driver volume that is no longer in the lower chamber. The recycle chamber, a repository of water at a lower level, is connected, via a sliding recycle door, to the lower chamber.

The void in the lower chamber gets filled with water when the recycle door opens. Water flows down from the recycle chamber to the lower chamber as the water level in the recycle chamber is higher than the top of the lower chamber. After filling the void, close the recycle door and open the tower door to combine all waters from the upper chamber and lower chamber which includes the volume of water that filled the void. The upper chamber's narrow-wide-long design, when used in conjunction with a buoyant driver, allows the water tower system to release water, equal to the volume of water that filled the void, from the upper chamber. Releasing water lowers the buoyant driver back to the original position in the water tower for repeat operations. Released water is used for energy and power productions and recycled.

BRIEF DESCRIPTION OF THE DRAWINGS

The drawings show preferred embodiments and are not intended to limit the scope of the present invention. The vertical mechanical separation of water (VMSW) designation is used to describe both the method and the VMSW operating system including all of the components as well as the physical structures. The water tower designation is used specifically for vertically arranged upper and lower chambers and the fixtures in them to clearly describe the water volume in the water tower during various stages of the operation.

FIG. 7 is a perspective view of VMSW, with the piston being pulled into its cylinder back to the initial settings, filling the reservoir.

FIG. 8 is a perspective view of VMSW showing, at the end of fifth operation, starting conditions are restored.

FIG. 12a is a perspective view of VMSW showing a buoyant object moving clockwise from entering a recycle chamber and awaiting deployment at the staging area on top of wide-section.

FIG. 12b is a perspective view of VMSW showing a cross-section view of vertical guides with a buoyant object in the middle.

DETAILED DESCRIPTION OF THE INVENTION

VMSW requires external power to operate. All sensors and measurements tools need to be powered and required to communicate with the VMSW control system. Throughout the discussion and declaration, action verbs such as open, close, push, pull, grab, lock, release, etc. require powered and motorized components to perform a routine, but specific function or task with each task performed and validated before the VMSW control system takes the next step automatically. VMSW could use commercially available and off the shelf sensors and motorized components. Therefore, descriptions and functionalities of the commonly used parts are not provided in detail—such as opening a sliding door, etc.

Throughout the discussion, each term or terminology represents a unique component or feature in the present invention to further clarify descriptions and methods.

Figure 1:
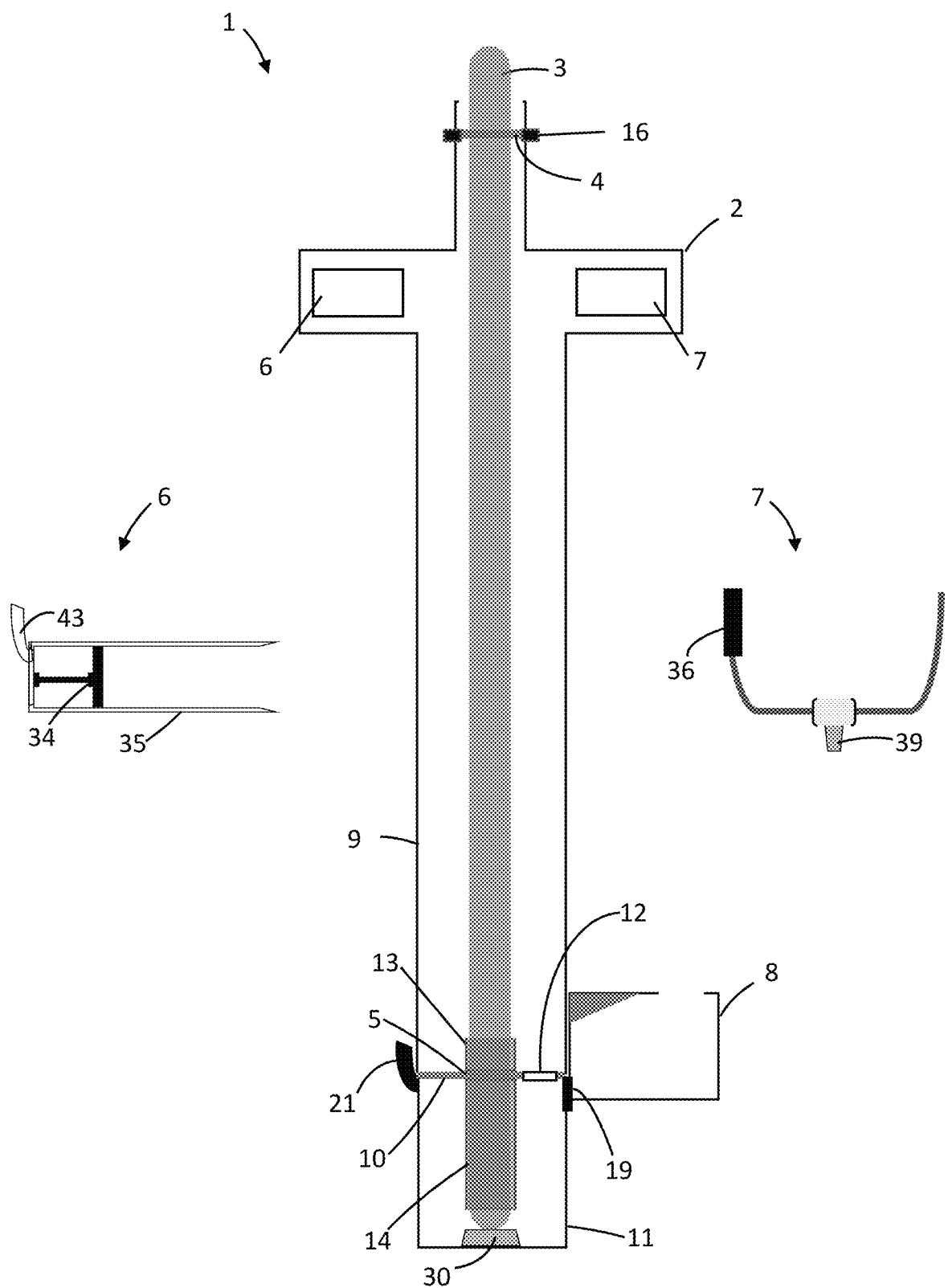
FIG. 1 is a schematic diagram of a perspective side view of VMSW with exploded views of: a side view of the piston and cylinder, a form of a water storage-supply tank (WSST); a side view of the reservoir.
Figure 2A:
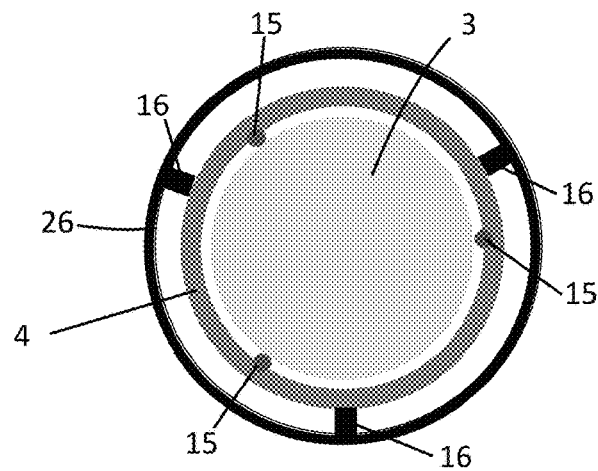
FIG. 2a is a perspective view of VMSW showing a cross-section view of the top alignment ring.
Figure 2C:
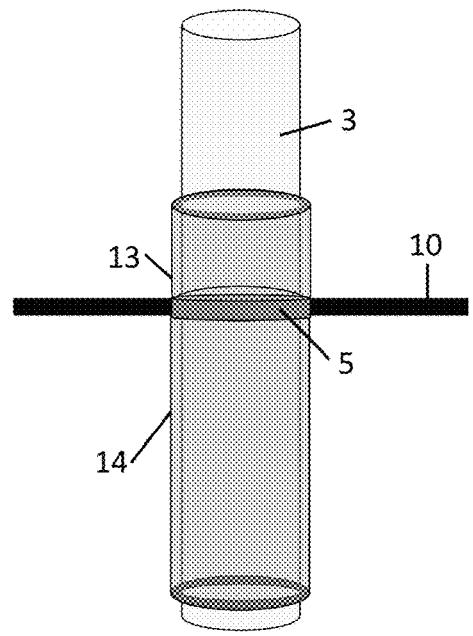
FIG. 2c is a perspective view of VMSW showing a side view of the upper and lower bellows secured to the driver and to the bottom alignment ring.
Figure 2B:
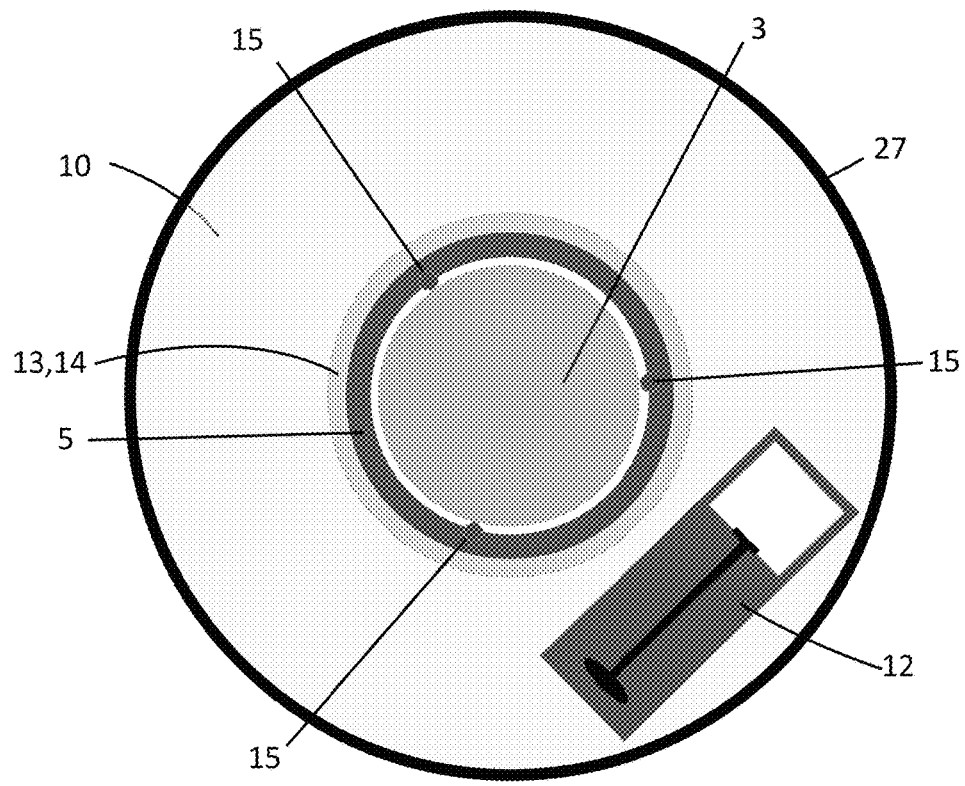
FIG. 2b is a perspective view of VMSW showing a cross-section view of the bottom alignment ring.

FIG. 1 shows a perspective side view of VMSW 1 comprising a water tower 2, a driver 3, a top alignment ring 4, a bottom alignment ring 5, a water storage-supply tank (WSST) 6, a reservoir 7, and a recycle chamber 8. VMSW 1, wherein a positively buoyant driver 3 is constrained to move in the water tower 2 through the top alignment ring 4 and the bottom alignment ring 5 in a straight vertical line. FIG. 2a, 2b show cross-section views of the top alignment ring 4 and the bottom alignment ring 5.

FIG. 3 through FIG. 8 show VMSW 1 in various stages of the operation, wherein the water tower 2 (FIG. 1) further comprises an upper chamber 9, a separator 10 and a lower chamber 11. Entire upper part of the water tower 2 above the separator 10 is considered the upper chamber 9. The separator 10 is effectively the bottom of the upper chamber 9 and also the top of the lower chamber 11. Vertical movement of the driver 3 is limited to be less than the height of the lower chamber 11. As shown in FIG. 2b, the separator 10 further comprises a sliding tower door 12 (~/1;3opened in FIG. 2b) and a bottom alignment ring 5.

Figure 3:
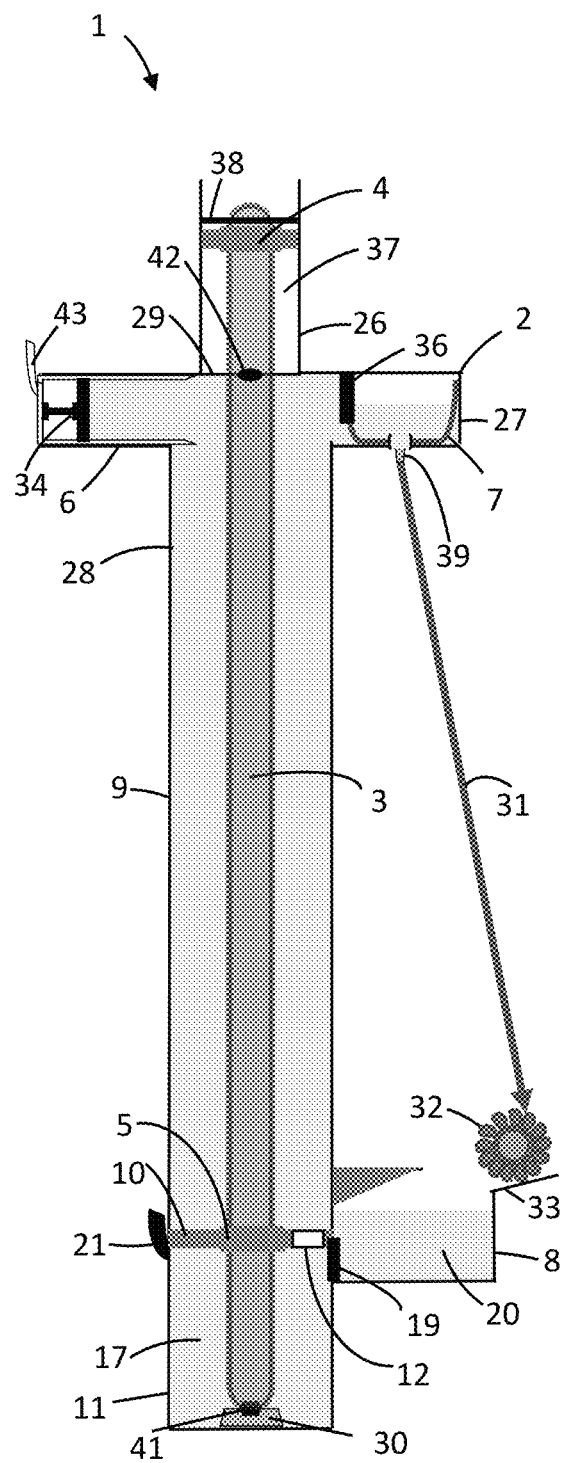
FIG. 3 is a perspective view of VMSW showing the starting conditions or initial settings.

As shown in FIG. 3, for example, opening the tower door 12 combines waters from the upper chamber 9 and the lower chamber 11. FIG. 2c shows the bottom alignment ring 5 is connected to the watertight compressible upper bellows 13, and lower bellows 14 covering the portion of the driver 3 that would move through the bottom alignment ring 5.

As shown in FIG. 2a, 2b, ball bearings 15 are placed inside both alignment rings 4, 5 to minimize surface-contact and friction with the driver 3. FIG. 2a shows the top alignment ring 4 has rigid rods 16 secured to the water tower 2 near the top of the upper chamber 9 (as shown in FIG. 1, for example), preferably above water.

With a driver 3 in place through both alignment rings 4, 5, closing the tower door 12 separates the upper chamber 9 from the lower chamber 11 and they are no longer in fluid communications. With the tower door 12 closed, as shown in FIG. 5, raising a cylinder-shaped driver 3 achieves vertical mechanical separation of water in the water tower 2 without lifting the water in the upper chamber 9 or displacing any water in the lower chamber 11. Water level in the upper chamber 9 does not change—with the use of a cylinder-shaped driver 3, for example (compare FIG. 4 and FIG. 5). For the lower chamber 11, water compressibility is very small and may be ignored.

Figure 4:
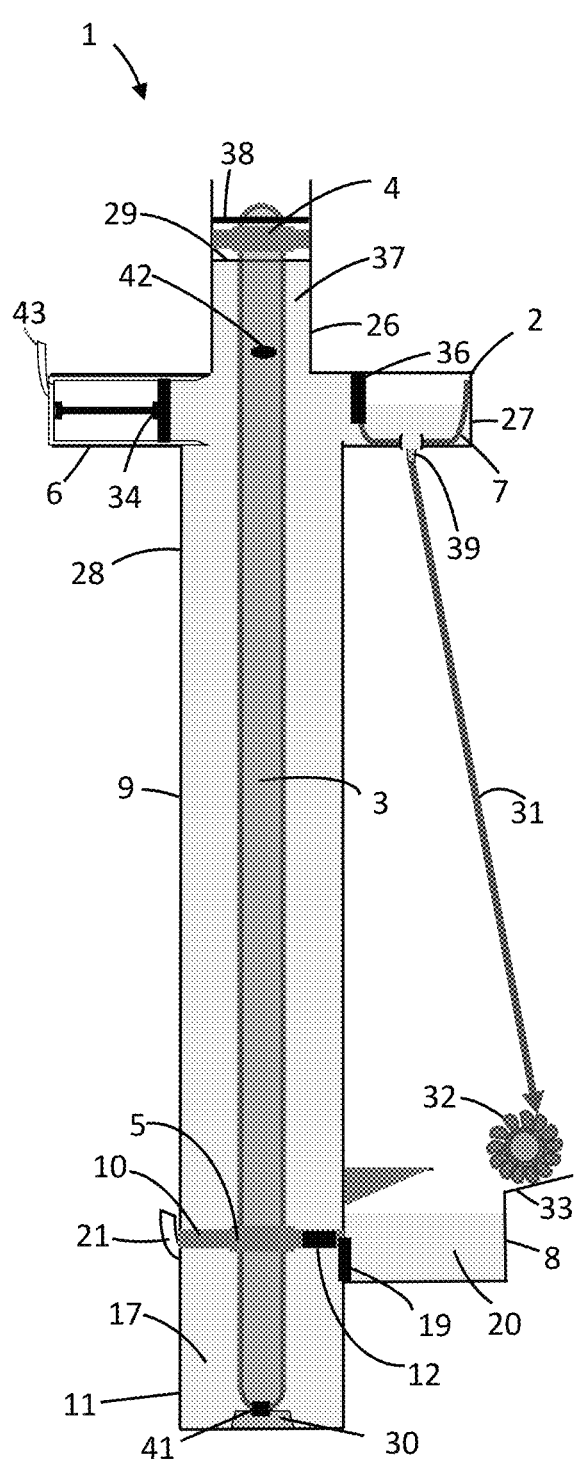
FIG. 4 is a perspective view of VMSW showing the narrow-section of the upper chamber filled with water—referenced as the first phase of the operation.
Figure 5:
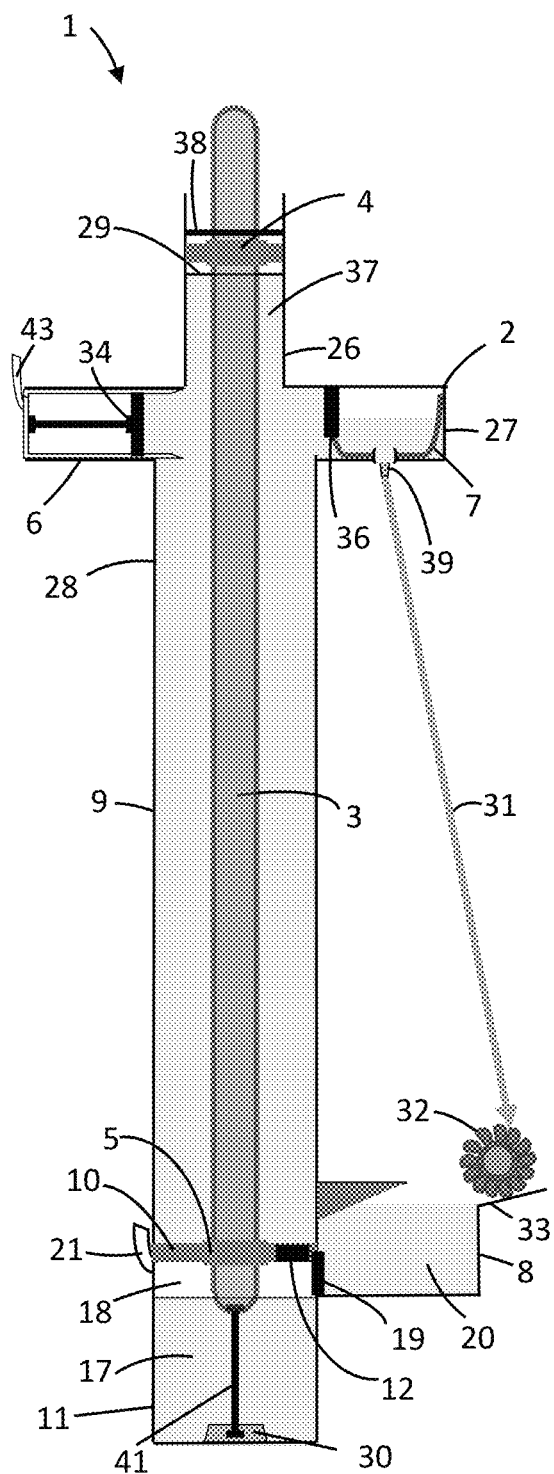
FIG. 5 is a perspective view of VMSW having produced a void in the lower chamber equal to the volume of the driver no longer in the lower chamber—referenced as the second phase of the operation.
Figure 6:
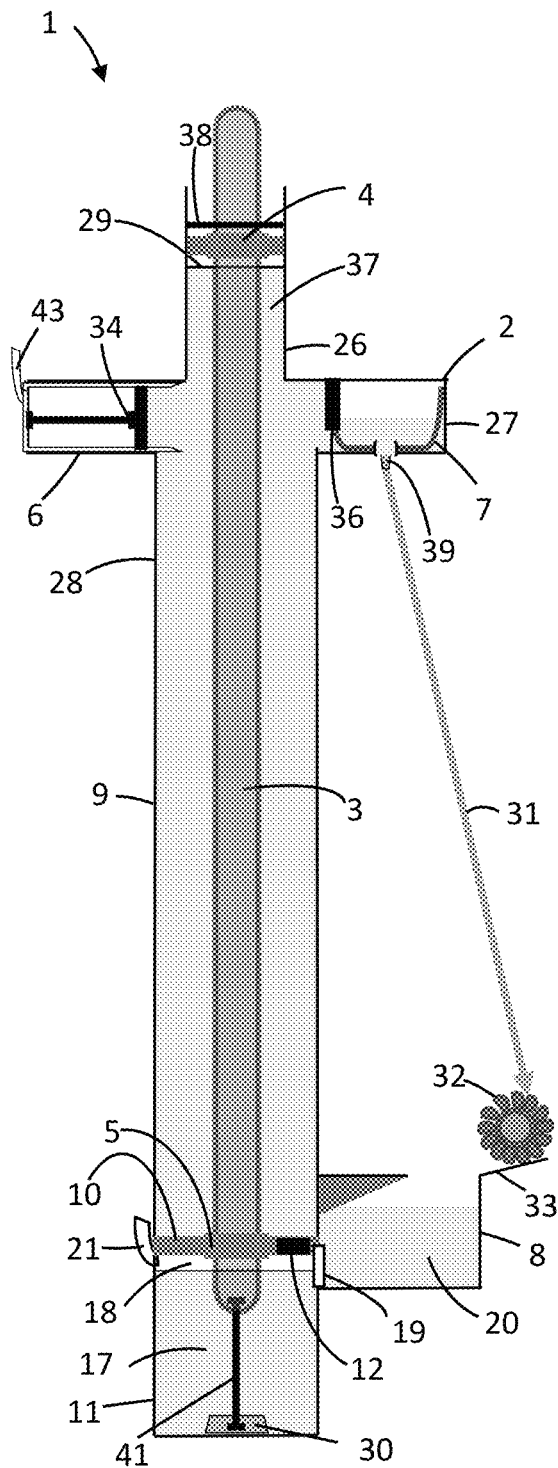
FIG. 6 is a perspective view of VMSW showing the recycle chamber water, through open recycle door, filling the void in the lower chamber—referenced as the third phase of the operation.

The lower chamber water volume 17, as shown in FIG. 3, FIG. 4 and FIG. 5, remains the same as the driver 3 moves up producing a void 18 (FIG. 5) in the lower chamber 11. As shown in FIG. 5, the water level in the lower chamber 11 drops according to the volume equal to the void 18 in the lower chamber 11. For further clarification, VMSW produces a void 18 as a result of dropping the water level without losing the water volume 17 in the lower chamber 11. As shown in FIG. 6, opening a recycle door 19, that connects the lower chamber 11 and the recycle chamber 8, allows water or hydro discharge 20 from the recycle chamber 8 to flow down and into the lower chamber 11. Opening the tower and recycle doors 12 and 19 simultaneously will drain water from the upper chamber 9. The lower chamber vent 21 should be open only after closing the tower door, for example.

As shown in FIG. 6, it is important to observe that VMSW 1 transfers water from the recycle chamber 8 down to the lower chamber 11 of the water tower 2. The recycle chamber 8 is situated above the lower chamber 11 with the recycle chamber 8 water level kept higher than the top of the lower chamber 11. Water is not forced into the lower chamber 11 of the water tower 2.

Figure 9:
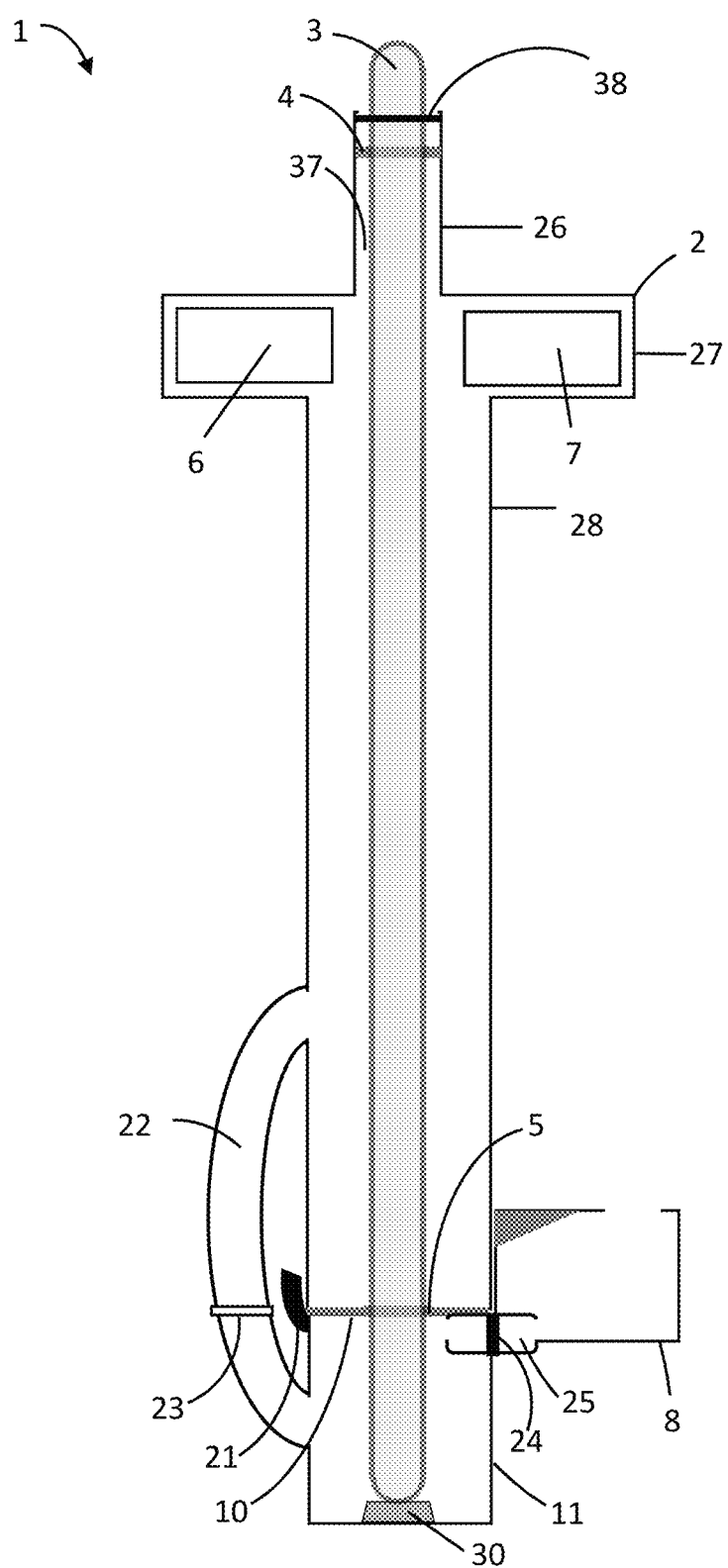
FIG. 9 is a perspective side view of VMSW showing external conduits and control gate valves as replacements of the doors from inside the body of the water tower.

For easier maintenance and operations, the tower door could be taken out of the separator 10. As shown in FIG. 9, a large external conduit 22 connects the upper chamber 9 and the lower chamber 11 with a control valve 23 with a comparable size to the tower door, at the height of the separator 10. A control valve 23 plays the same role of the tower door. Similarly, as shown in FIG. 9, the recycle door could be replaced with a control valve 24 on an external conduit 25.

Upper chamber 9 above the separator 10, as shown in FIG. 3, for example, comprise three distinct sections for different purposes: a narrow-section 26, a wide-section 27, and a long-section 28. With the tower door 12 closed, the water level 29 only represents the upper chamber 9. A slim feature of the narrow-section 26 helps to control the water level 29 with a relatively small volume of water whereas the wide-section 27 provides a large water movement and displacement in the upper chamber 9 with minimal effects to the water level 29. The long-section 28 contributes to establishing the head or vertical water fall height. Using the least volume of water to change the water level 29 is important to minimize both time and power consumption to operate VMSW 1.

As shown in FIG. 1, for example, the lower chamber 11 further comprises a lower chamber vent 21 and a driver stopper 30. As shown in FIG. 6, for example, the recycle chamber 8 receives hydro discharge 20, coming from a reservoir 7 through a penstock 31 and a hydro turbine 32, at the recycle chamber entrance 33. A vent 21, placed at the highest level in the lower chamber 11, eliminates any suctioning effects to the driver 3 when the tower door 12 is closed. By eliminating any trapped air pockets in the lower chamber 11, the vent 21 allows for efficient filling of the void 18 with water or hydro discharge 20.

The driver's neutrally buoyant point (NBP) 42 is where the buoyant force pointing up and the weight (=mass× gravity) pointing down are balanced. In FIG. 3, the density of the driver 3 is such that the driver's NBP 42 is at the initial water level 29. In other words, with water filled to the bottom of the narrow-section 26 section, the driver 3 rests on the stopper 30 weightlessly.

So long as the water depth exceeds the driver's NBP 42, the driver NBP 42 should be at the water level 29. When the driver NBP 42 is above the water level 29 (FIG. 7), when released, the driver 3 will move down to have its NBP 42 match the water level 29 (FIG. 8). If the driver 3's NBP is below the water level 29 (FIG. 4), when released, the driver 3 will move up to have its NBP 42 match the water level 29.

VMSW 1 relies on redundant sensors for monitoring, controlling and operating all operable components as well as water flow rate, water volume and water level in all chambers including the reservoir 7. Before starting an operation, the following initial settings of VMSW 1 need to be established:

1) a recycle door 19 is closed; a recycle chamber 8 filled with water and maintains its water level higher than the top of the lower chamber 11;
2) a lower chamber vent 21 is closed;
3) a tower door 12 is open;
4) a reservoir gate 36 is closed; it would be useful but not necessary to fill the reservoir 7 initially; in FIG. 3, the VMSW 1 starts with reservoir 7 half-filled with water—representing a steady operating condition;
5) FIG. 3 shows a piston 34 in its normal position; notice that the piston 34 is not all the way pulled into its cylinder 35 to allow for both positive and negative water movement;
6) a water tower 2, as shown in FIG. 3, is filled with water to the bottom of the narrow-section 26—establishing an initial water level 29 and leaving the gap 37 open between the driver 3 and the narrow-section 26;
7) as shown in FIG. 3, a positively buoyant driver 3, through alignment rings 4 and 5, rests weightlessly on a stopper 30—with the driver's NBP 42 at the water level 29.

Figure 10A:
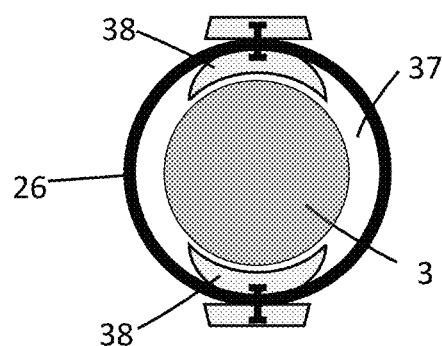
FIG. 10a is perspective view of VMSW showing a cross-section view of a brake to secure lock a driver in position.
Figure 10B:
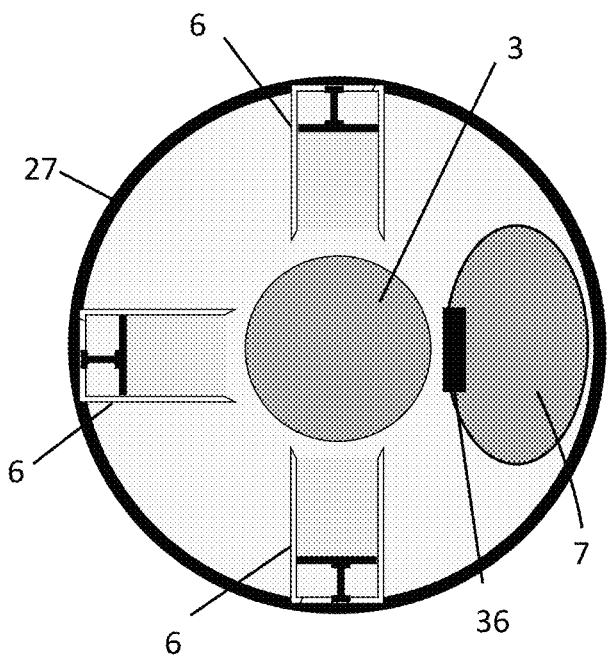
FIG. 10b is perspective view of VMSW showing a cross-section view at the wide-section in the upper chamber: three piston-and-cylinders and a reservoir.

Once VMSW 1 initial settings, as shown in FIG. 3, are verified using multiple redundant sensors, start the first phase of (notional) five-phase operation by ensuring and performing following sequential tasks, i.e., after each task is completed and verified, the next task is performed automatically:

1) apply a mechanical brake 38 (FIG. 10*a*), located above the top alignment ring 4, (FIG. 4, for example) to lock the driver 3 in its place as it rests on the stopper 30 weightlessly.
Driver 3 can't go lower than the stopper 30;
2) close the tower door 12; keep both the recycle door 19 the reservoir gate 36 closed;
3) open the vent 21 as shown in FIG. 4;
4) raise the water level 29 in the upper chamber 9 by pushing the piston 34 out of its cylinder 35 (FIG. 4). The difference in the piston 34 positions and corresponding water levels 29 are shown in FIG. 3 and FIG. 4. More than one WSST 6 could be used. FIG. 10*b* shows, in the wide-section 27, one reservoir 7 and three WSST 6 units with each unit in the form of a piston 34 in a cylinder 35. Since the water is already filled to the bottom of the narrow-section 26 and the reservoir gate 36 closed (FIG. 4), the water being pushed by the piston 34 fills the gap 37 between the driver 3 and the narrow-section 26. This action raises the water level 29, as shown in FIG. 4, in the narrow-section 26. Energy used to perform this task is independent of the length of the long-section 28.

It should be noted that when the tower door 12 is closed and the vent 21 opened, i.e., when the upper chamber 9 and the lower chamber 11 are no longer in fluid communications, the water tower 2 system no longer exerts the same pressure to the driver 3. The buoyancy force on an object remains the same at any water depth when the whole object is in the same body of water. In the present invention, by separating the upper chamber 9 from the lower chamber 11 which is then exposed to air using the vent 21, the driver 3 is in separated waters with different buoyant force than before.

In separated waters, the portion of the driver 3 below the separator 10 essentially becomes a dead weight to the driver 3 above the separator 10. It is important to have the driver 3 with adequate positive buoyancy to overcome the dead-weight effects which also has bearings on the height of the lower chamber 11. This so-called dead-weight factor is proportional to a percentage of the driver 3 volume in the lower chamber 11—assuming uniform weight and volume distribution in driver 3. FIG. 4 shows the driver's NBP 42 at a higher level than in FIG. 3. Unless the driver 3 could overcome the dead-weight factor, the driver 3 will not move. As the buoyant driver 3 starts moving up, the portion of the driver 3 below the separator 10 becomes smaller and the dead-weight effects also become smaller.

Having validated the first phase of the operation using multiple redundant sensors, VMSW 1 continues with the second phase with releasing the driver 3 from a locked position. Vertical mechanical separation of water is achieved when the driver 3 starts moving up following the raised water level 29, producing a void 18 in the lower chamber 11. Once the driver 3 reaches the height corresponding to the raised water level 29, as illustrated in FIG. 5, lock the driver 3 at this elevated position by engaging a mechanical brake 38. It should be noted that the lower chamber water volume 17 does not change during this operation, but simply a portion of driver 3 is no longer in the lower chamber 11. The volume of the void 18, as shown in FIG. 5, is equal to the portion of driver 3 that is no longer in the lower chamber 11.

Upon sensor validation of previous actions, VMSW 1 continues with the third phase with opening the recycle door to take in water or hydro discharge 20 from the recycle chamber 8 into the lower chamber 11 to fill the void 18 (FIG. 6). When the void 18 is filled, the recycle door 19 is closed and the vent 21 is closed.

Upon sensor validation of previous actions, the fourth phase starts with opening the tower door 12 to combine waters from the upper chamber 9 and the lower chamber 11, and parts of this action shown in FIG. 7. Although water or hydro discharge 20 was added to the lower chamber 11 in the water tower 2, as soon as the tower door 12 opens, all the waters are combined to make one body of water in the water tower 2. The water tower 2, excluding the reservoir water, now has more water than it started out.

Upon sensor validation of previous actions, the fifth phase involves transferring water from the wide-section 27 to a reservoir 7 and VMSW 1 recovering the initial settings (FIG. 8). Pulling back the piston 34 into its cylinder 35 takes water down from the narrow-section 26 which also lowers the water level 29 to the bottom of narrow-section 26—reversing an action of the first phase of the operation. Water movement is continuously monitored using redundant sensors. Opening a reservoir gate 36 (FIG. 7), positioned in an upper part of the wide-section 27, allows the reservoir 7 to take in water from the wide-section 27 up to the volume of water that filled void 18. Similar to filling the void 18 (FIG. 6), this is a passive water transfer (high water in wide-section 27 flow down into the reservoir 7) and opening the reservoir gate 36 fills the reservoir 7. This further lowers the water level 29, as shown in FIG. 7 with driver 3 still locked at an elevated position. After transferring the water equal to the void 18 volume, close the reservoir gate 36. Wide-section 27 design allows for a large water volume movement while minimally impacting the water level 29. Water level 29 in the upper chamber 9 drops matching the water volume that was transferred to the reservoir 7. Notice that the driver NBP 42 is above the water level 29 (FIG. 7) and the driver 3 will move down, when released, and restore the water level 29 to the initial settings (FIG. 8).

In FIG. 7, with the piston 34 back at the original starting position, the combined volume of remaining waters, in the upper chamber 9 and the lower chamber 11, is now the same as in the initial settings. The water level 29 is lower than VMSW 1 initial settings only because the driver 3 is locked in an elevated position. By having the same total water volume in the water tower 2 consistent with all the conditions in the initial settings, when released, the driver 3 goes back down restoring VMSW 1 initial settings. Driver 3 may be released from a locked position at any time during the fifth phase of the operation.

By pulling back the piston 34 into its cylinder 35 beyond its original starting position, more water could be drawn into the cylinder 35 to temporarily lower the water level 29 even more to help lower the driver 3 faster back to the stopper 30. As the driver 3 reaches the stopper 30, push the piston 34 back to the original setting and the water level 29 is back at the bottom of the narrow-section 26 lining up with the driver's NBP 42. VMSW 1 is back at the initial conditions (FIG. 8).

In a steady state operations mode, throughout five-phase operations, the reservoir 7 would continue to release water through the control valve 39 down to a penstock 31 turning hydro turbine 32. Hydro discharge 20 will enter back into the recycle chamber 8 for reuse. At the end of the fifth phase, after VMSW 1 is back to the initial settings and verified, repeat the operations.

Additional discussions and descriptions of major parts of VMSW 1 are provided below.

Water tower 2

Water tower 2 could easily be made as tall as 100-m similar to a hub length of a multi-MW WTG. Unlike a WTG hub providing mainly the vertical structural support to the generator and blades above, VMSW 1 requires the water tower 2 to hold water in its chambers. Even with optimizing a shape and volume of the water tower 2, VMSW 1 might be heavier than WTGs of comparable capacity to produce electricity. Keeping a tall and slim water tower upright would be a challenge. However, unlike WTGs that have to be built approximately 7 rotor diameters apart (¼ to ⅓ of a mile), VMSW 1 units could be built and operated next to each other or next to new or existing structures such as tall buildings or even alongside bridges. Also, by having three or more VMSW 1 units structurally connected via connecting rods, for example, VMSW 1 could be made much more structurally stable.

Water tower 2 could be built by stacking multiple sections. Instead of making the structure of the water tower 2 itself watertight, the present invention prefers to use watertight containment lining that could be replaced every~5 years rather than performing major bodywork to the water tower 2 itself to maintain watertight requirements—significantly lowering the cost to build, operate and repair VMSW 1.

It is preferred to have multiple units of VMSW 1 to form a VMSW farm. Filling the water tower 2 of the dimension being discussed requires a lot of work—with each water tower 2 taking enough water to fill a very large swimming pool. With multiple units to standup, one could first fill and operate one water tower 2 and instead of supplying raised water down to turbines, the reservoir 7 water could be sent to an adjacent water tower 2, and so on—until all units are filled with water. By having a common water recycle chamber 8 with separate recycle door 19 for each VMSW 1 unit, draining and filling each water tower 2 would be much simpler.

A main source of water loss from VMSW 1 is through evaporation. The present invention prefers to cover open or exposed parts of VMSW 1 such as top of the narrow-section 26 and the recycle chamber 8—to substantially reduce water loss due to evaporation. Also, placing covers on VMSW 1 keeps unwanted materials or debris from getting into the water.

Driver 3

Driver 3 could be a metal or carbon composite shell filled with sand, for example. It is preferred that the driver 3 has a symmetrical shape with uniform weight and volume distribution and have a smooth external surface to minimize the drag force. Building, transporting, and installing a 100-m long driver 3 would be a major undertaking; however, the driver 3 does not have to be a single body. The present invention prefers, similar to putting together the water tower 2, the driver 3 be an assembly of sections that also allow easier scalability.

Driver 3 length and volume are designed to achieve the required head (vertical drop height) and the void 18 volume in the lower chamber 11. Generally speaking, longer the driver 3, with a matching water tower 2, higher the placement of reservoir 7; larger the driver 3 volume, more water or hydro discharge 20 could be recycled. Driver 3 could have different densities and shapes while maintaining positive buoyancy. It is preferred that a driver 3 has symmetrical shapes—especially at both ends to keep the same shape and volume moving through top and bottom alignment rings 4, 5.

Figures 11A, 11B:
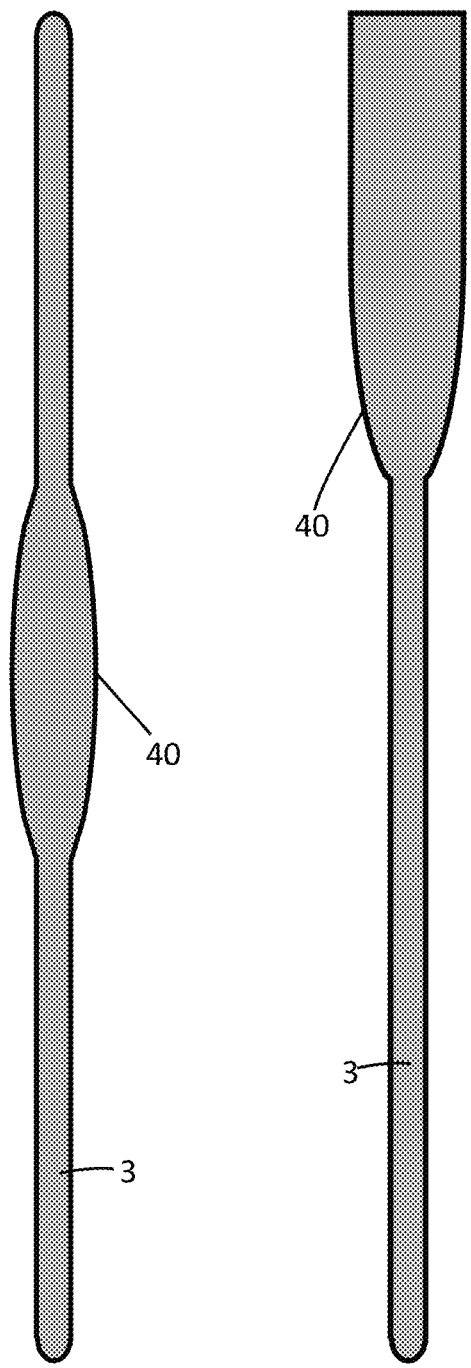
FIG. 11a is perspective view of VMSW showing a variation of a driver with a large midsection.
FIG. 11b is perspective view of VMSW showing another variation of a driver with a large top section.

Shown in FIG. 11*a* is a variation of driver 3 with a large midsection 40. While keeping an overall density of the driver 3 the same, this shape shown in FIG. 11*a*, for example, allows better control by having more driver 3 volume in the upper chamber 9 compared to a simple cylinder-shaped driver 3. When the upper chamber 9 is no longer in fluid communication with the lower chamber 11 by closing the tower door 12, the buoyancy force raising the driver 3 comes primarily from the upper chamber 9. While keeping the same density, having a larger driver 3 volume in the upper chamber 9 is advantageous with additional buoyance force while reducing the dead-weight effect.

Yet another variation of driver 3 is shown in FIG. 11*b* with a shape representing a sailboat—with a very long keel. This is to help illustrate that a positively buoyant driver 3, like a sailboat, will move up and down with changes in the water level 29—so long as it has adequate positive buoyancy. There could be many more variations of the driver 3.

The cycle time to complete a five-phase operation is directly related to the speed of the driver 3, which is largely determined by its [buoyancy force—(weight+drag force)]. The drag force is generally proportional to the area of an object and square of speed of the object. Driver 3 starts at rest at the stopper 30 and moves a few meters and may not gain much speed in the water tower 2. For a case of delivering 27,000 liters of input fuel to a hydroelectric generator, the driver 3 travels about 3.3-m each direction—assuming a radius of 1.7-m. Due to substantial drag force acting on a large object combined with the time applying a brake 38, driver 3 may take more than few seconds to travel~3.3 m distance in water tower 2. Speed of the driver 3, on its way up, also depends on the dead-weight effects. In order to keep the cycle to be about 30 seconds for the example being considered here, each of the five-phase operation should take on average~6 seconds.

There are other means to control driver 3 movement with or without changing the water level 29. First, if a driver 3 has 80% of water density, then applying continuously a little more than~20% of its weight will submerge the driver 3—essentially making its effective density slightly larger than that of water. However, the work or energy to lift the same driver 3 increases as the driver 3 is being pulled out of water. VMSW 1 uses a mechanical device 41 (FIG. 5), a motorized hydraulic jack, for example, embedded onto the stopper 30 at the bottom of water tower 2, to move the driver 3. Using a mechanical device 41 to push and pull a driver 3 would yield similar outcomes to all methods of changing effective density via controlling mass and volume of the driver 3.

The driver 3 in motion goes through different phases: starting from rest, i.e., no speed, to building up the speed, and finally the terminal speed. Especially moving up, the speed of the driver 3 reaches its maximum at the end and the kinetic energy of the driver 3 is significant, which could be harvested to help support, for example, operating a mechanical device 41.

Minimizing time to operate VMSW 1 is important as it directly affects the capacity factor of the system. It is preferred to keep the top of a driver 3 above water. Consequently, the driver 3 has different drag force applied between up and down movements. Unlike the upward movement, the driver 3 on its way down has to push against the water below. Driver 3 shape comes into play here as well especially if the portion of the driver 3 that moves through the bottom alignment ring 5 is not uniform, then time difference becomes even larger between driver 3 moving up and down.

For a multi-MW VMSW 1, reducing the cycle time by even a second or two would significantly improve the capacity factor. For example, during the fifth phase of the operation, when the driver 3 starts moving down following the lowered water level 29, the driver 3 could also be mechanically pulled down to save time. Since energy is required to operate a mechanical device 41, VMSW 1 system-design analysis should be performed to see if changing the water level 29 even more would be more effective. VMSW 1 system level optimization would dictate how to combine and manage functions of a WSST 6 and a mechanical device 41 to minimize time and energy.

WSST 6 at driver's neutrally buoyant point 42

Many benefits for the present invention would be substantially reduced if the WSST 6 placement is not optimized. For example, a WSST 6 operating at the ground level would take proportionally more work and energy to pump water as the long-section 28 becomes taller. Or in the case of using a piston 34, due to water pressure differences as a function of depth in the upper chamber 9, the piston 34 pushing water near the bottom takes much more energy than near the top of the upper chamber 9. Therefore, it is necessary to position the WSST 6 at appropriate height—to minimize the time and energy to manage the water level 29.

The driver's neutrally buoyant point (NBP) 42 is where the buoyant force pointing up and the weight (=mass× gravity) pointing down are balanced. In FIG. 3, the driver 3 density is such that the driver's NBP 42 is at the initial water level 29. In other words, with water filled to the bottom of the narrow-section 26, the driver 3 rests on the stopper 30 weightlessly.

With water depth at least equal to the driver's NBP 42, pushing the piston 34 out of its cylinder 35 moves water into the narrow-section 26 and raise the water level 29. Operating the piston 34 right below the driver's NBP 42 takes the least amount of energy. Placing the piston 34 much lower would take more work due to increase in water pressure. Going higher than the driver's NBP 42 does not help since there is no water initially to push above the driver's NBP 42.

Within practical limits of building and operating large and tall structures, the length of the long-section 28 in the water tower 2 may be increased for more vertical drop height or the head.

Opening a reservoir gate 36 allows the reservoir 7 to take in water from the wide-section 27 which provides a high-elevation point in the water tower 2, with a large volume of water. Depending on a sequence of operations, the reservoir 7 could be jointly operated with the piston 34 to further control the water level 29. Reservoir 7 provides input fuel or hydro intake to a penstock 31 through a control valve 39. A piston cylinder vent 43 is always open (FIG. 3, for example).

Separator 10 and bellows 13, 14

To ensure there is no water loss from the upper chamber 9 to the lower chamber 11 through the bottom alignment ring 5, watertight compressible bellows 13, 14 wrap the portion of the driver 3 (FIG. 2c and FIG. 2b) that moves through the bottom alignment ring 5. Upper bellows 13 and lower bellows 14 are secured tightly around the driver 3 and connected to the front and the back of the bottom alignment ring 5, respectively (FIG. 2c). The inside gap between the driver 3 and bellows 13, 14 is connected and filled with water, for example. The driver 3 would interact with ball bearings 15 of the bottom alignment ring 5 within the boundaries of the bellows 13, 14.

Although very complicated and complex, it is possible to make the present invention work without using the watertight bellows 13, 14. Again, without using the watertight compressible bellows 13, 14, consider a case with just a 1-mm space or gap all around between the bottom alignment ring 5 and the driver 3 with a radius =1.7 m. The water pressure from the upper chamber 9 down to this small 1-mm gap, equivalent to having a hole with~12-cm diameter, would release~270 liters/sec and reduce the recycling capacity. The upper chamber 9 water (~270 liters/sec) contributes to filling the void 18 and proportionally less from the recycle chamber 8. Furthermore, the WSST 6 needs to be made larger, using more energy to handle additional water needs to make the system comparable to a no-gap system with the watertight compressible bellows 13, 14.

Much more difficult to quantify would be the overall system level effects coming from the entire water volume in the upper chamber 9 moving down while 270-liter/sec is being leaked, through a small gap, to the lower chamber 11—while the driver 3 is moving up. The watertight compressible bellows 13, 14 help mitigate these difficult problems. It should be noted that the 1-mm gap, used as an example above, does not play a role in the driver 3 moving down to the original position since the tower door 12 would be already open and waters are already combined.

As shown in FIG. 2c, the bellows 13, 14 cover the portion of a driver 3 that moves through the bottom alignment ring 5 and secured at both sides of the separator 10. Bellows 13, 14 maintain a near constant volume. As the driver 3 moves up, the upper bellows 13 decompress (or stretch) and the lower bellows 14 get compressed. The upper bellows 13 experience relatively steady state conditions in the upper chamber 9 whether the tower door is open or not. The lower bellows 14 experience a large water pressure (~7 atm in the example being considered) when the tower door 12 is open and, at the other extreme, some parts of the lower bellows 14 may be exposed to air (~1 atm) when the driver 3 moves up to produce a void 18. Bellows 13, 14 need to withstand extreme operating conditions. It is beneficial to have the bellows 13, 14, filled with water, for example, as close to the driver 3 as possible to keep the bellows 13, 14 volume smaller and more manageable.

Buoyant object 44 filling the void 18

In addition to recycling water, one or more buoyant object 44 could also be inserted into the void 18 for recycling. As with recycling water, VMSW 1 will produce the void 18 following the five-phase operations described above.

A buoyant object 44 could be a large and heavy sphere but less dense than water such as a spherical shell—made with iron, for example—with a radius of ~0.6-m and 900-kg mass at 98% density of water. As the buoyant object 44 enters the recycle chamber 8, it is grabbed by a motorized mechanical arm 45 that operates from the recycle chamber 8 (FIG. 12a). The mechanical arm 45, equipped with sensors to detect the buoyant object 44's position, applies necessary power to overcome the positive buoyancy of the object 44 to submerge underwater and place it into the lower chamber 11. In the case being considered in this section, adding 2% of the weight of the object 44 or 18 kg, which could easily come from the mechanical arm 45 itself, will make the object 44 neutrally buoyant and easy to move in water—although slowly.

Once a void 18 is produced in a lower chamber 11, as done for recycling water, open the recycle door 19 to allow the mechanical arm 45 to move the object 44 into the lower chamber 11. The buoyant object 44 is then secured under a buoyant object holder 46 (as shown in FIG. 12a) within the vertical guides 47, 48 that could take various shapes and forms. The mechanical arm 45 is retrieved back into the recycle chamber 8. For simplicity in explaining functionalities, three bars secured to the water tower 2 form vertical guides 47, 48 and FIG. 12b shows a cross-section view of the vertical guides 47, 48 with a buoyant object 44 in the middle. As shown in FIG. 12a, vertical guide 47 covers the upper chamber 9 while a shorter vertical guide 48 is in the lower chamber 11. One of the bars forming the vertical guide 48 is even shorter to allow the mechanical arm 45 to position the buoyant object 44 within the vertical guide 48. Vertical guides 47, 48 are disconnected at the separator 10 allowing the tower door 12 to operate. Due to the size of the buoyant object 44, when the tower door 12 opens, small disconnect in the vertical guide 47, 48 does not cause problems.

After the recycle door 19 and the vent 21 are both closed, VMSW 1 opens the tower door 12, then a signal is sent to the buoyant object holder 46 to release the buoyant object 44 which then moves through the guide tubes 48, 47 to reach the top of the wide-section 27. After a wide-section door 49 is triggered to open, on top of the wide-section 27 as shown in FIG. 12a, a crane 50, secured to the top of the wide-section 27, mechanically grabs and pulls the object 44 out of the wide-section 27 and places it on the staging area 51. Recycling buoyant objects 44 take additional work using the crane 50 that is not needed for water recycling.

The terminal velocity of the buoyant object 44 traveling up a long-section 27 and into the wide-section 28 (~50-m or more when combined) could be substantial as a function of its density: smaller the density compared to that of water, faster the buoyant object 44 rises. The kinetic energy of the buoyant object 44 after being released by the buoyant object holder 46 could be potentially harvested.

There are various ways to convert the potential energy of the object 44 to kinetic energy for power generation. Once its potential energy has been harvested, the buoyant object 44 enters, through the recycle entrance 33, back into the recycle chamber 8 for reuse.

Energy Calculations

It is useful to review how much work is required to operate VMSW 1. In an example given below, an initial water level 29 is at the bottom of the narrow-section 26 which is also the driver NBP 42 at 56-m mark for a 70-m long driver 3 that has 80% of water density (FIG. 3). Water needed to raise the water level 29 depends on the inside dimensions of the narrow-section 26 and the outer dimensions of the driver 3 that is in the narrow-section 26.

Due to buoyancy force, a positively buoyant driver 3 moves as the water level 29 changes. A lower portion of the driver 3 moves vertically through the bottom alignment ring 5 in the separator 10. By keeping the shape and volume of this lower portion of the driver 3 uniform and having the same shape and volume at the top of driver 3, the driver 3's movement would not affect the water level 29 in the upper chamber 9.

Assume a cylinder-shaped driver 3. The narrow-section 26 also has a cylinder shape inside. A gap 37 is 10-cm all around between the driver 3 and the inside of the narrow-section 26. Raise the water level 29 by 3.3-m using the piston 34 to push water into the narrow-section 26. The example being considered here would have the lower chamber 11 to be about 4-m tall.

Outside radius of the driver 3=1.7 m
    Driver 3 volume for the 3.3-m segment=$\pi \times (1.7\text{-m})^2 \times 3.3\text{-m} \cong 30.0 \text{ m}^3$ (This would be the maximum size of the void 18 in the lower chamber 11)

Inside radius of the narrow-section 26=1.8 m
    Volume of the narrow-section 26 for the 3.3-m section=$\pi \times (1.8\text{-m})^2 \times 3.3\text{-m} \cong 33.6 \text{ m}^3$ With the driver 3 extending from the stopper 30 and well into the narrow-section 26 (as shown in FIG. 3), the piston 34 pushes up 3.6-m³ water to fill the gap 37 covering the 3.3-m segment in the narrow-section 26. This is relatively small volume of water to raise the water level 29. When released, the positively buoyant driver 3 rises producing a void 18 in the lower chamber 11 (as shown in FIG. 5), that would be filled with water from the recycle chamber 8. The water level 29, representing the upper chamber 9, does not need to change with the driver 3 moving up.

With the recycle door 19 and the vent 21 both closed, open the tower door 12 to combine all waters from the upper chamber 9 and the lower chamber 11. At this point, start transferring water from the wide-section 27 to the reservoir 7 while pulling the piston 34 back. The wide-section 27 has the most water volume per unit height in the water tower 2. It is possible to temporarily lower the water level 29 more by further pulling back the piston 34. When the combined water in the water tower 2 is down to the initial conditions, the driver 3, when released, will move down on its own and reach the stopper 30. Moving the piston 34 back to its original position will make the driver 3 rest on the stopper 30 weightlessly. Energy to operate the piston 34 is primarily needed for pushing water and pulling back the piston 34 would take minimal energy since the water will be doing the pushing against the piston 34.

Net gain is in the form of potential energy from 30.0 m³ of water from the reservoir 7 through a penstock 31 (head=50-m). P.E. from 30-m³ of water with 70% efficiency is $$(30{,}000 \text{kg} \times 9.8 \text{ m/sec}^2 \times 50 \text{ m}) \times 0.70 = 10.3 \text{ MJ}$$

For operating VMSW 1, energy to push 3.6-m³ water into the narrow-section 26 by 3.3 m at 70% efficiency is $$(3{,}600 \text{ kg} \times 9.8 \text{ m/sec}^2 \times 3.3 \text{ m})/ 0.70 \cong 0.17 \text{ MJ}$$

Since this work is done using a piston 34 in the wide-section 27, it stays largely constant independent of the long-section 28 length—so long as VMSW 1 meets the initial settings requirements discussed previously. Depending on the driver 3 design such as its shape and volume as well as the size of gap 37, the energy needed to operate VMSW 1 varies significantly.

The largest energy-use component, to help address the dead-weight issue and to help move a driver 3, is the mechanical device 41 using~1 MJ in the example considered here. It is also possible to apply some of this energy to raise the water level 29 even more for more buoyancy force to move the driver 3.

Therefore, power that could be generated from input fuel of 30.0-m³ of water is approximately $$(10.3 \text{ MJ}—0.17 \text{ MJ}—1.0 \text{ MJ})/30\text{-sec} \cong 304 \text{ kW}$$

In this example, VMSW uses 0.17 MJ and 1.0 MJ once during a 30-sec operation.

In addition to using power to operate a piston 34 and a mechanical device 41, operating the rest of VMSW 1 equipment such as a tower door 12, a recycle door 19, a vent 21, locking and releasing a driver 3 using a brake 38, etc. would benefit from having access to the grid, similar to WTGs, for example. VMSW 1 needs to have a standalone UPS (uninterruptible power supply) battery backup. As a figure of merit, power needed to operate a tower door 12 or recycle door 19 would be comparable to operating a garage door, for example, with ~1 hp motor.

CONCLUSION

VMSW, a hydro-mechanical system, takes input fuel—in the form of water or a buoyant object —into a lower chamber of a vertically arranged water tower and releases the fuel from near the top of an upper chamber.

In essence, VMSW makes a room or a void for additional water in the lower chamber preferably without any changes to the original water volume in the lower chamber. After water has been added to the lower chamber void, opening a fluid communication between the lower chamber and the upper chamber combines all waters in the water tower. Water has an interesting property in that there is no difference—for power production applications—between the actual water added to the lower chamber and the water that was initially at the top of the upper chamber. For energy generation and power production, VMSW releases water from the upper chamber for maximum head. Water released, equal to the volume that filled the void, restores VMSW for repeat operations.

Specifically, VMSW recycles water using the lower chamber without displacing water already in the lower chamber using a driver, a buoyant device, that operates in the water tower. The driver moves through a bottom alignment ring that is integrated into the separator without losing or transferring water, using watertight compressible bellows, between the two chambers.

VMSW allows different shapes and forms for the driver to manage and regulate water distribution to produce a void in the lower chamber. In addition to buoyancy, VMSW uses a mechanical device, such as a motorized hydraulic jack to push or pull the driver to control water movement.

VMSW has three distinct sections in the upper chamber: the narrow-section at the top of the upper chamber primarily to manager water level; the wide-section for a large water volume movement; the long-section for vertical height or the head. VMSW uses a piston in cylinder to change the upper chamber's volume for water. By placing the piston near the top of the wide-section in the upper chamber, VMSW efficiently moves water in and out of the narrow-section to manage the water level.

Once a lower chamber void is produced, the void could be filled with water when the recycle door opens. Recycle chamber water flows into the lower chamber as the water level in the recycle chamber is higher than the top of the lower chamber.

After filling the void, closing the recycle door and opening the tower door combines all waters in the water tower that now includes the water that filled the void. Releasing water—equal to the volume that filled the void—lowers the driver back to the original position in the water tower for repeat operations. Released water through a penstock turns a hydro turbine, located near the ground, to generate electricity. Hydro discharge coming out of a hydro turbine is collected in the recycle chamber for reuse.

Ability to recycle water as input fuel allows VMSW to operate in a fully enclosed configuration and provides much more flexibilities compared to traditional hydro power plants, for example.

VMSW is scalable. The head is proportional to the length of the long-section in the upper chamber. Volume of the void depends on the driver volume. Larger the void, more power could be produced. VMSW uses conduits to take critical components out of the water tower for easier repair and maintenance. Without altering or compromising functionalities, these conduits allow slimmer and simpler water tower design.

VMSW, with additional apparatus, could fill the void with one or more positively buoyant object in addition to recycled water. Regardless of its weight, a positively buoyant object, once placed in the water tower by filling the void, will rise to the top of the upper chamber. Buoyancy force alone brings the buoyant object to the water surface regardless of the length of the long-section in the upper chamber. The buoyant object is then pulled out of the wide-section and released to generate power.

The preferred embodiments of the present invention provide innovative ways to recycle a large volume of water and supply to a higher elevation for various applications including generating electricity. The present invention provides additional opportunities of integrating VMSW-based hydro-mechanical systems into the mix of other renewable energy options. VMSW could be scaled up for gigawatt-capacity production. Since each VMSW unit operates individually and independently, a VMSW farm could operate continuously while allowing for rolling maintenance, repairs, and upgrades.

Although the invention has been explained in relation to its preferred embodiments, it is to be understood that many other possible modifications and variations can be made without departing from the spirit and scope of the invention.

The invention claimed is:

1. VMSW, a hydro-mechanical system, for generating electricity comprising:
   a driver, a term used exclusively to describe a positively buoyant device, to regulate water distribution in a water tower;
   said driver moves vertically in the water tower;
   said water tower, filled with fluid, preferably water, further comprising:
      an upper chamber; said upper chamber further comprises:
         a narrow-section at the top to manage water level in a water tower with minimal water use; the bottom of said narrow-section is designed to be initially the driver's neutrally buoyant point (NBP) where the buoyant force and the weight of said driver are balanced;
         a wide-section below said narrow-section to manage a large volume of water while minimizing changes to the water level in said water tower; initially water is filled to the top of said wide-section which is also the bottom of said narrow-section;
         a long-section below said wide-section to establish the head or the vertical drop height;
         a brake to control said driver's position in said water tower by applying and releasing;
         preferably placed above water in said narrow-section;
         with said brake fully applied to a driver, the driver is then immovable and rigidly held to the water tower structure;
      said lower chamber; said lower chamber further comprises:
         a stopper to position said driver at the bottom of said water tower;
         a mechanical device, a motorized hydraulic push-pull mechanism, for example, to assist moving said driver;
         a lower-chamber-vent, placed on a wall of the lower chamber at the highest level;
      a separator dividing said upper chamber and said lower chamber;
      said separator further comprises:
         a bottom alignment ring;
         a plurality of bellows that are watertight and compressible;
         a tower door—a sliding door connecting said upper chamber and said lower chamber;
   a water storage-supply tanks (WSST) to provide functionalities of adding and removing water to change the water level in said water tower;
   a reservoir, placed preferably in a wide-section of said upper chamber, to take in and release water from said water tower;
   a recycle chamber, a repository of water near said lower chamber, with its water level always above the top of the lower chamber, to store and supply water to said lower chamber;
   said recycle chamber comprises a recycle door—a sliding door connecting said lower chamber and said recycle chamber.

2. The apparatus of claim 1, further comprising:
   a plurality of alignment rings in said water tower, to ensure driver's movement is vertical; said alignment rings further comprise:
      ball bearings or similar items to minimize surface contact and friction with said driver;
      a top alignment ring near the top of said upper chamber, preferably placed above water;
      a bottom alignment ring integrated into said separator;
   said bellows, watertight and compressible, to prevent unintended water transfer from said upper chamber to said lower chamber while allowing the driver to move; the ends of said bellows are secured and sealed around the driver covering the driver-segment that moves through said separator;
      an upper bellows, placed in an upper chamber, are secured around the driver and connected to the top of the separator;
      a lower bellows, placed in a lower chamber, are secured around the driver and connected to the bottom of the separator;
      an upper bellows stretches, and the lower bellows compresses as the driver moves up;
      a lower bellows stretches, and an upper bellows compress as the driver moves down.

3. VMSW of claim 1, wherein:
   a preferred embodiment for a WSST is a piston and cylinder;
   placement of the WSST is designed to minimize the time and energy of adding and draining water for the purpose of changing the water level in said water tower;

said WSST is preferably placed near the top of the wide-section;

water is initially filled to the top of the wide-section in said upper chamber;

water level in said water tower is generally maintained so as to not fall below said wide-section;

a piston when pushed out of its cylinder reduces volume for water in said wide-section, and forces water level in said upper chamber to rise;

a piston when pulled into its cylinder increases volume for water in said wide-section, and forces water level in said upper chamber to drop.

4. VMSW of claim 1, wherein a reservoir comprises:

a reservoir gate to connect said reservoir to said upper chamber—preferably in the wide-section;

a control valve to control releasing water down through a penstock as a preferred embodiment from said reservoir for energy conversion and power production;

placement of said reservoir is designed to maximize the head or the vertical distance for water drop.

5. VMSW of claim 1, wherein said tower door could be replaced with a connecting conduit, between the upper chamber and the lower chamber, with a conduit gate control valve replacing said tower door; one or more said conduits may be used;

wherein said recycle door could be replaced with a connecting conduit, between said lower chamber and said recycle chamber, with the conduit gate control valve replacing said recycle door;

said conduits provide VMSW options to minimize operable parts inside the water tower for easier maintenance and operations.

6. VMSW of claim 1 modified, wherein new-additions are applied to said VMSW; said new-additions comprising:

a shell, a term used exclusively to describe a positively buoyant object;

said shell gets inserted into a void in the lower chamber and upon reaching top of a water tower said shell is then released for energy production;

a shell holder to hold or release said shell;

when not blocked or held, said shell rises to the surface of the water due to its positive buoyancy;

a plurality of powered mechanical arms;

a plurality of guide bars or tubes to ensure straight vertical moves for said shells in said water tower;

a sliding door at the top of the wide-section;

a staging area for holding and releasing said shell on top of the wide-section;

a powered crane with said mechanical arms to pull said shell out of said upper water chamber and place it onto said staging area; when released from said staging area, said shell starts moving down converting its potential energy to kinetic energy; upon applying its usable potential energy, the said shell enters said recycle chamber and awaits its turn to be placed back into said void.

7. A method of recycling water for energy production, said method comprising steps of:

a) establishing the initial settings, to which VMSW will return to—after completing each cycle of operations, comprising:

a motorized piston is in its initial position—positioned preferably at about 25% mark from the end of its cylinder; depending on how many pistons are used, said piston positioning could change; open a cylinder-vent to eliminate suctioning effects as said piston moves in its cylinder;

a recycle door, a reservoir gate, and a lower-chamber-vent are all closed;

a tower door is open;

a recycle chamber is filled with water;

a positively buoyant driver operates in said water tower, that is vertically arranged with an upper chamber and a lower chamber, through top and bottom alignment rings, and rests weightlessly on a stopper;

said water tower is filled with water to the driver's neutrally buoyant point (NBP) which is at the bottom of the narrow-section and also the top of the wide-section—establishing the initial water level for VMSW;

adding water above the driver's NBP will increase the driver's buoyancy force and make the driver rise;

b) During all phases of the operations, water movement, water level and water volume are continuously monitored using redundant sensors; upon positive confirmation of the initial settings, the first step is performed automatically with the first step comprising:

1) apply a brake to lock said driver in place—as said driver rests on said stopper weightlessly; said driver can't move;

2) close said tower door; open said lower-chamber-vent to eliminate any suctioning effects to said driver;

3) raise water level in said upper chamber by pushing said piston out of its cylinder; since water is already filled to the bottom of said narrow-section, water pushed by said piston fills the gap between said driver and said narrow-section;

c) having validated the previous steps taken using multiple sensors, the next step is performed automatically comprising:

1) release said brake to unlock the driver from its holding position; said driver then starts moving up, through said top and bottom alignment rings, following the raised water level;

2) assist by pushing up said driver using a powered mechanical device to reduce the cycle time and help offset the dead-weight effects since said driver is in separated waters in said water tower since the upper chamber and the lower chambers are not connected;

3) vertical mechanical separation of water in said water tower is achieved as said driver starts rising and producing a void in said lower chamber; the volume of said void comes from the portion of said driver no longer in said lower chamber; the water volume in said lower chamber is still the same;

4) apply said brake to lock the driver at the raised position corresponding to the raised water level;

d) having validated the previous steps taken using multiple sensors, the next step is performed automatically comprising:

1) open said recycle door to transfer water from said recycle chamber to fill the void in said lower chamber; since the water level in said recycle chamber is kept higher than the top of said lower chamber, opening said recycle door allows passive filling of said void; the lower-chamber-vent also plays a role in filling said void efficiently by not trapping air pockets;

2) when the void in said lower chamber is filled with water, close said lower chamber-vent and said recycle door; at this point, transferred water from said recycle chamber to the lower chamber is completely in said water tower;
e) having validated the previous steps taken using multiple sensors, the next step is performed automatically comprising:
open said tower door to combine waters from said upper chamber and said lower chamber;
f) having validated the previous steps taken using multiple sensors, the next step is performed automatically comprising:
1) pull back said piston into its cylinder to the initial settings position, and take water down from said narrow-section, which lowers the water level in said upper chamber;
2) said reservoir water level is lower than that of said wide-section; open said reservoir gate to fill the reservoir up to the volume of water that filled the void in said lower chamber;
said wide-section allows for a large water volume movement while minimally affecting the water level changes in said water tower; at this point, with said piston back into its cylinder as was in the initial settings position, the water volume in said water tower is back to the initial settings;
g) having validated the previous steps taken using multiple sensors, the next step is performed automatically comprising:
1) release said brake and allow said driver to move;
2) assist by pulling down said driver using a powered mechanical device to reduce the cycle time; since said water tower is back to the initial settings including its water volume, said driver moves down to said stopper—reclaiming its position and the water level is restored back to the initial settings;
h) independent of the previous steps from 14-b) to 14-g), having validated using multiple sensors that there is sufficient water in said reservoir, continuously release the reservoir water for energy conversion and power production; hydro discharge or exiting water from the hydro turbine generator is collected in the recycle chamber for continuous recycling;
i) having validated that the VMSW is back to the initial settings as found in 14-a), repeat the steps 14-b) to 14-g) while the step 14-h) is performed independently.

8. The method of recycling said water for energy production as recited in claim 7 including recycling a shell for energy production, said method comprising the steps of:
a) follow the same procedure outlined in steps 14-a) to 14-c) to produce a void in said lower chamber; as said shell enters said recycle chamber, motion-sensor equipped and powered mechanical arm grabs said shell and moves it closer to said recycle door and awaits VMSW to open said recycle door; said mechanical arm supplies power to move said shell;
b) upon positive verification of having produced a void in said lower chamber, VMSW opens said recycle door; using said mechanical arm, place said shell within the guide bars under a shell holder in said lower chamber; retrieve said mechanical arm back into said recycle chamber; upon positive verification of all the steps taken, close said recycle door and close said lower-chamber-vent;
c) upon validating said recycle door is closed and said lower-chamber-vent is closed, the signal is sent to open said tower door before said shell holder releases said shell to rise; with said driver still locked at an elevated position;
d) upon reaching the top of said wide-section, said shell triggers to open said wide-section door, situated on the top of said wide-section, equipped with sensors to open; said crane, equipped with sensors to detect said shells, mounted on top of said wide-section, grabs and pulls said shell out of said wide-section and places said shell on the staging area; said staging area could hold a number of said shells; the water level in said water tower is lowered corresponding to the volume of said shell pulled out of the water tower; after pulling said shells out of said wide-section, close said wide-section door;
e) perform steps 14-f-1) and 14-g);
f) release said shells from the staging area, successively or in bunches as the application demands, engaging various energy generating devices; as said shells reach the lower level at or near the ground, they enter back into said recycle chamber for reuse;
g) having validated the VMSW is back to said initial settings, as found in the method step 14-a), repeat the steps 16-a) to 16-g).

* * * * *